…

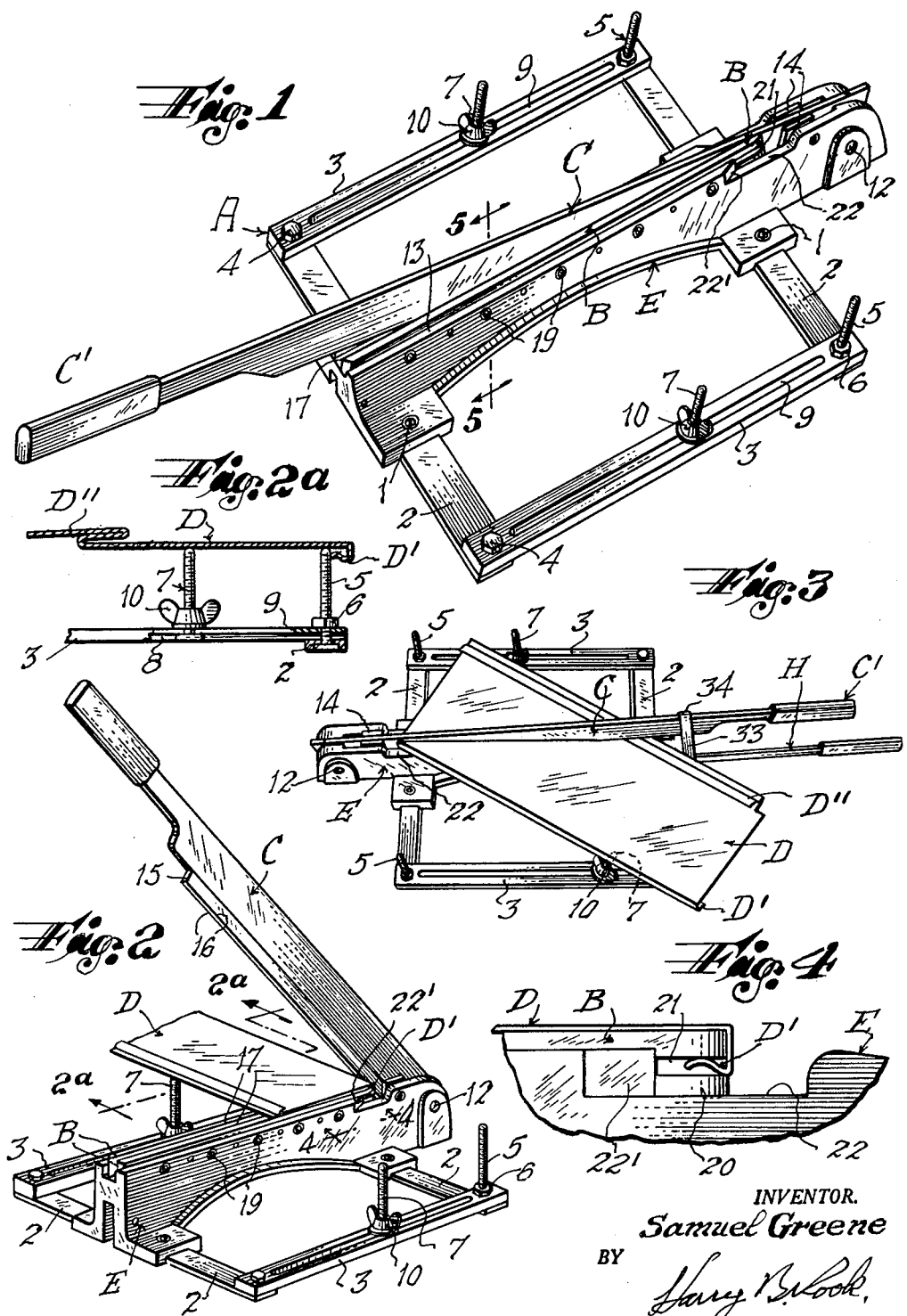

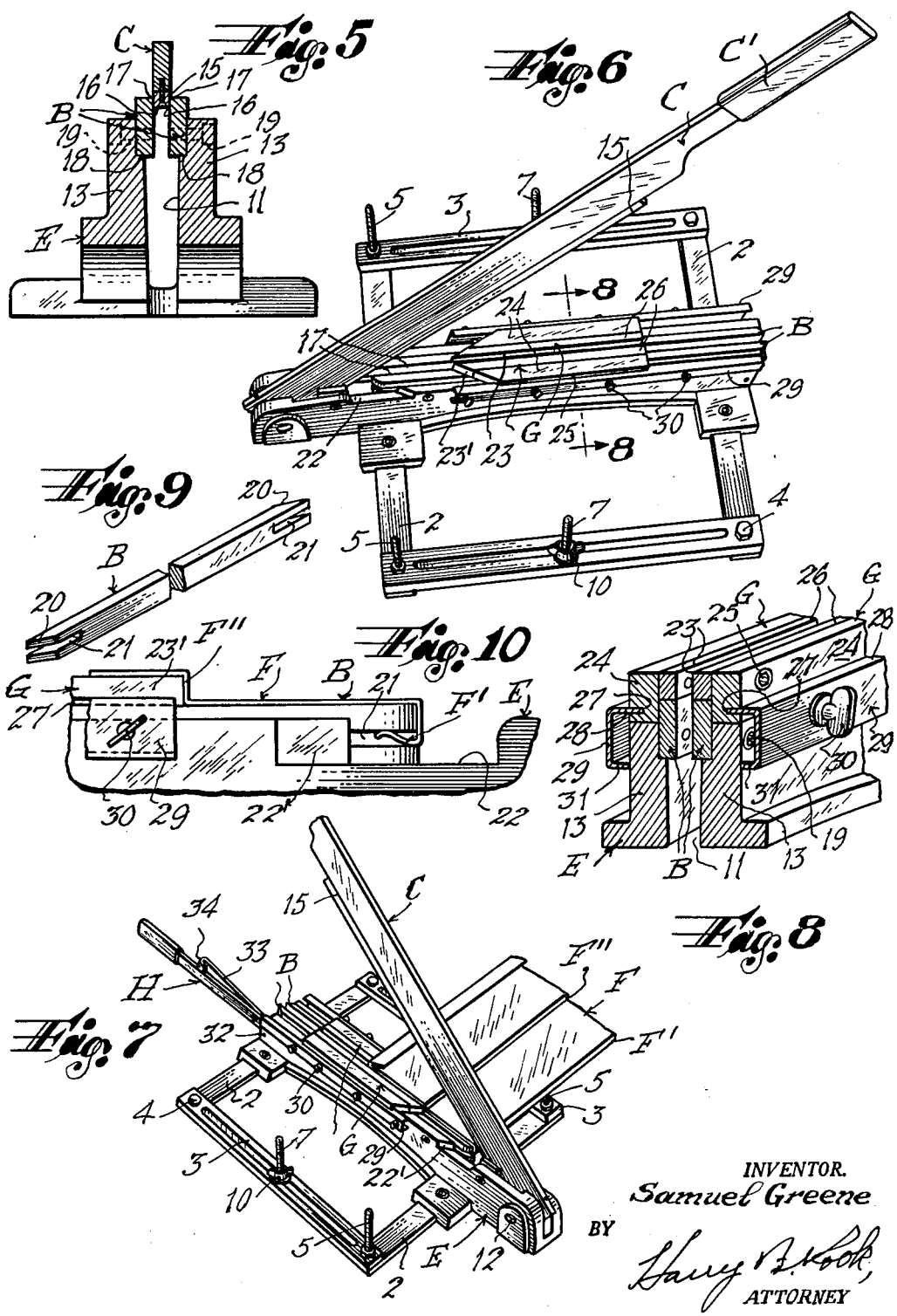

United States Patent Office 3,134,285
Patented May 26, 1964

3,134,285
SIDING CUTTER
Samuel Greene, 212 Weequahic Ave., Newark, N.J.
Filed Sept. 11, 1961, Ser. No. 137,213
1 Claim. (Cl. 83—467)

This invention relates in general to a machine for cutting aluminum siding that is used for facing the outer walls of buildings. The siding is usually provided by the manufacturer in the form of strips of sheet aluminum having the longitudinal edges properly shaped for interlocking the courses of the siding, and it is necessary during the installation or application of the siding to cut the strips to the proper lengths and also to cut the ends of some of the strips at various angles to accommodate angles in the building walls such as at the intersection of the side wall and roof gable. The strips are generally supplied in two forms, one strip being about eight inches wide to give a simulation of an eight inch siding board and commonly called "straight eight" siding, and the other strip being die pressed to simulate two four inch siding boards and known as "double four" siding.

An important object of the invention is to provide a machine which includes a novel and improved construction and combination of parts whereby the machine can be adapted easily and quickly to cut accurately either type of siding strip.

Another object of the invention is to provide a siding cutter which shall include a novel and improved construction and combination of a movable cutting blade to coact with either of two die blades to facilitate cutting either end of a siding strip.

A further object is to provide such a siding cutter which shall comprise a novel and improved combination of a frame, cutting blades, and support-guide posts whereby the siding strip can be located and held in various angular relations to the blades for making angle cuts.

Still another object is to provide a siding cutter which shall be easily portable and capable of being mounted on a work horse at the site of installation of the siding, which shall be relatively noiseless as compared with an electric saw that is commonly used for cutting siding, and which shall permit the cutting of the siding without the formation of small chips of metal that are frequently formed with known siding cutters and cause both inconvenience and danger to the operator.

Other objects are to provide a siding cutter which shall be relatively simple and inexpensive and easy to operate and to provide other objects, advantages and results which shall be brought out by the following description in conjunction with the accompanying drawings in which:

FIGURE 1 is a perspective view of a siding cutter embodying the invention with the movable blade in cutting relation to the fixed or die blades;

FIGURE 2 is a perspective view on a reduced scale of the siding cutter shown in FIGURE 1 and illustrating the manner of locating a "straight eight" strip of siding for cutting the end thereof perpendicularly to the length of the siding strip;

FIGURE 2a is a fragmentary enlarged transverse vertical sectional view approximately on the plane of the line 2a—2a of FIGURE 2;

FIGURE 3 is a perspective view from another angle showing the manner of making an angle cut in a siding strip;

FIGURE 4 is a greatly enlarged fragmentary side elevation taken approximately from the vertical plane of the line 4—4 of FIGURE 2;

FIGURE 5 is an enlarged transverse sectional view on the plane of the line 5—5 of FIGURE 1;

FIGURE 6 is a perspective view of the siding cutter with the parts arranged for the cutting of a "double four" siding strip;

FIGURE 7 is a perspective view from another angle of the siding cutter shown in FIGURE 6 and illustrating the manner of cutting a "double four" siding strip perpendicularly to the length of the strip;

FIGURE 8 is a transverse sectional view on the plane of the line 8—8 of FIGURE 6;

FIGURE 9 is a detailed perspective view of one of the fixed or die blades; and

FIGURE 10 is an enlarged view similar to FIGURE 4 showing the arrangement of the "double four" siding on the fixed or die blades of the machine.

Specifically describing the embodiment of the invention illustrated in FIGURES 1 through 5, the machine includes a frame generally designated A on which are mounted fixed or die blades B with which coact a movable blade C for cutting a so-called "straight eight" aluminum siding strip D.

The frame is shown as comprising a main portion E that preferably is in the form of a casting and to opposite ends of which are secured as by cap screws 1, end bars 2, each of which extends equi-distantly from opposite sides of the main portion E. The frame also includes side bars 3 each of which has its ends connected to the end bars 2 at one side of the main portion E and parallel to said main portion. As shown, each of the side bars 3 has one end rigidly connected to one of the end bars 2 by a cap screw 4 while its other end is connected to one end of the other end bar by a fastening element that is in the form of a bolt 5 having a head underlying and abutting the corresponding end bar and having a threaded shank passing loosely through registering openings in the end bar and side bar, on which is screw-threaded a nut 6. The shank is of a length and projects upwardly above the side bar so that its upper end is approximately in a common horizontal plane with the upper edges of the die blades B providing a rest for the siding strip D to thereby serve as a support-guide post cooperative with said blades for supporting the siding strip. The frame also has mounted on each of the side bars an adjustable support-guide post 7 that is shown in the form of a bolt whose head is square and slidable in a groove 8 in the under surface of the corresponding side bar and whose threaded shank projects upwardly through a longitudinal slot 9 in the side bar and has screw-threaded thereon a wing nut 10 whereby the support-guide post may be slidably adjusted lengthwise of the corresponding side bar for the purpose to be hereinafter described.

The main portion E has a longitudinal recess or slot 11 to receive the die blades B and the movable blade C. As shown, the movable blade has one end pivotally mounted at 12 on and between the side walls 13 of the main portion at opposite sides of the slot so that the blade may be swung upwardly and downwardly in the slot about the pivot 12. Preferably, guide blocks 14 are secured at opposite sides of the blade to the slot walls 13 in spaced relation to the pivot 12 to guide the blade in its movements into and out of the slot between the die blades.

The movable blade C is shown as having a cutting element 15 separably connected to the edge of the blade and having two cutting edges 16 each to cooperate with the cutting edge 17 of one of the fixed or die blades B.

Each die blade is removably secured to one of the walls 13 of the main portion in the slot 11, as best shown in FIGURE 5, and as illustrated, the inner surfaces of the side walls 13 of the main portion have recessed seats 18 for the die blades in which the blades are secured by cap screws 19. For the sake of economy, each die blade is reversible and has beveled ends 20 and deep longitudinal grooves 21 as best shown in FIGURE 9. The die blades are shown as rectangular in cross section so that by reversing the blades, the cutting edges may be selectively brought into coactive relation to the movable blade C. The upper edge portion of each side wall 13 is cut away at 22 to expose the corresponding ends of the die blades and facilitate the positioning of the siding strip with respect to the blades.

As shown, each siding strip has at one longitudinal edge a butt portion that is in the form of an angular flange D' and at its other longitudinal edge a nailing portion D", and when it is desired to cut a siding strip perpendicularly to its length, the strip is set with its butt flange D' in the grooves 21 of the die blades as best shown in FIGURE 4 and with another portion of the butt flange abutting one of the support-guide posts 5 and other portions of the strip resting on one of the adjustable support-guide posts 7 as best shown in FIGURES 2 and 2a. When it is desired to make an angle cut in the siding strip, the butt flange D' is inserted into the grooves 21 of the die blades as hereinbefore described, but another portion of the butt flange abuts one of the adjustable support-guide posts with the strip resting on the top end of the post which has been moved to the desired position to provide the proper angular relation of the siding strip to the blades as shown in FIGURE 3. Obviously, by changing the position of the adjustable support-guide post, the angle may be changed as desired. In order to allow the angular positioning of the siding strip, the ends of the cut away portions 22 of the side walls are beveled as indicated at 22'.

Now referring to the form of the invention shown in FIGURES 6 through 10 which is intended for use in cutting double four siding strip F, the construction is identical with that hereinbefore described except that there are auxiliary fixed blades G cooperative with the blades B. As best shown in FIGURE 10, the double four siding strip includes the usual butt edge flange F' and spaced from the butt flange a distance equal to the width of a four inch siding board is an offset portion F" which simulates the edges of another four inch siding board. The auxiliary blades G, in effect, compensate for the offset portion F" so that portions of the cutting edges 17 of the die blades B cooperate with the movable blade C to cut the siding strip along the portion thereof that represents the first four inch siding board, while the cutting edges 23 of the auxiliary blades cooperated with the movable blade C for cutting the portion of the siding strip corresponding to the second four inch siding board. The ends of the auxiliary blades G are abutted by the offset portion F" of the siding strip and are beveled as indicated at 23'.

FIGURE 7 shows the manner of cutting a double four siding strip perpendicularly to the longitudinal edges of the strip, and obviously, the siding strip can be cut at an angle by adjusting it with respect to support-guide posts and the fixed blades in the same manner as hereinbefore described in connection with FIGURES 1 to 5 inclusive.

The auxiliary blades G are separable or removable so that the machine can be adapted quickly for cutting either straight eight strips as shown in FIGURES 1 to 5 inclusive or for cutting double four strips as shown in FIGURES 6 to 10 inclusive; and for the purpose of removably mounting the auxiliary blades, those blades have been shown as comprising main bars 24 to set on the top edges of the side walls 13 of the main portion E of the machine and having separably secured thereto as by screws 25, cutter bars 26 on which the cutting edges 23 are formed, the cutter bars 26 resting on the top surfaces of the die blades B as best shown in FIGURE 8. For holding the auxiliary blades in this position, the main bars 24 are shown as formed with longitudinal grooves 27 in their outer faces, each of which receives a flange 28 of a channel-shaped clamping bar 29 which is removably secured to the outer surfaces of the side walls 13 of the main portion E by wing screws 30, with another flange 31 bearing against the outer surface of the corresponding side wall 13. Referring to FIGURE 8, it will be seen that the main bars 24 are clamped between the outer surfaces of the die blades B and the respective clamping bars 29 so that the cutting edges 23 are firmly held in proper relation for coaction with the movable cutting blade C.

In order to make symmetrical angle cuts at both ends of a siding strip, each adjustable support-guide post is moved the same distance from the corresponding fixed post, that distance being such as to permit the cut to be made at the desired angle. FIGURE 3 shows one adjustable post set for an angle cut at one end of the strip, and upon adjustment of the other post to the same position relative to the fixed post and turning the siding strip in its own plane, a symmetrical angle cut can be made at the other end of the strip. Obviously, by various adjustments of the posts, the angles of the cuts can be widely varied and in each case the siding strip is firmly held by the blades and the posts in proper relation to the blades.

It will be noted that the movable blade C has a hand grip C' at its outer end and that ordinarily a workman, by pressing down on this hand grip, can exert enough pressure on the cutting edges of the machine to cut a siding strip. However, in some cases, particularly when making angle cuts, additional leverage may be desired. In such cases, an auxiliary handle H may be provided with one end separably pivotally connected at 32 to the main portion E at the end thereof opposite the pivot 12 of the movable blade C, said handle having a pull link 33 pivotally connected at one end to the handle and having a hook 34 at its other end to hook over the movable blade C as shown in FIGURE 3 to provide extra leverage for manipulating the movable blade C during the cutting operation.

From the foregoing it will be seen that the invention provides a siding cutter that is light in weight and easily portable and can be stably supported on a work horse or other suitable support. The fixed blades serve as guides and rests for opposite end portions of a siding strip, respectively, and the support-guides at one side of each blade provide guides and rests for the intermediate portions of the siding strip, so that with the double-edged movable blade either end of the strip can be cut either perpendicularly to the length of the strip or obliquely thereto at different angles, as desired. Also, the machine is practically noiseless, especially as compared with electric saws that are generally used, and the machine eliminates all hinderances to the workman such as electric cables and chips of metal such as are produced by saws and the like.

While the now preferred embodimnets of the invention have been shown and described for the purpose of illustrating the principles of the invention, it will be understood by those skilled in the art that the structural details of the machine may be modified and changed within the spirit and scope of the invention.

I claim:

A machine for cutting siding having a butt flange, said machine comprising a horizontal rectangular frame and two horizontal stationary die blades mounted on the frame each of which has a horizontal cutting edge parallel to and spaced from the cutting edge of the other blade and also a notch in one end to receive said butt flange providing a guide and rest for an end portion of the siding strip, a fixed support-guide on said frame at the side of each stationary blade opposite the other stationary blade providing at its upper end a rest for said siding strip in approximately a common horizontal plane with the cutting edges of said horizontal blades to underlie said strip in abutting relation to said butt flange, an adjustable support-guide on said frame at the side of each stationary blade opposite the other stationary blade providing at its upper end a rest for said siding strip in approximately a common horizontal plane with the cutting edges of said stationary blades, said fixed support-guides being in horizontal alignment with said notched ends of the blades to hold the siding strip for a perpendicular cut, and the adjustable support-guides being adjustable in a direction that is parallel to the length of the stationary blades to hold the siding strip for an oblique cut with the butt flange of the siding strip in abutting relation to one adjustable support-guide, and a movable cutting blade on said frame movable between said stationary blades and having a cutting edge coacting with the cutting edge of each stationary blade.

References Cited in the file of this patent
UNITED STATES PATENTS

| Number | Name | Date |
|---|---|---|
| 187,065 | Summers | Feb. 6, 1877 |
| 337,270 | Kelsey | Mar. 2, 1886 |
| 363,524 | Libbey | May 24, 1887 |
| 1,127,857 | Bradley | Feb. 9, 1915 |
| 1,146,089 | Neely | July 13, 1915 |
| 1,443,303 | York | Jan. 23, 1923 |
| 1,750,411 | Bauve | Mar. 11, 1930 |
| 1,805,399 | Hendick | May 12, 1931 |
| 1,884,001 | Lewis | Oct. 25, 1932 |
| 2,120,926 | Baer | June 14, 1938 |
| 2,281,877 | Green | May 5, 1942 |
| 2,355,320 | Nebel | Aug. 8, 1944 |
| 2,563,741 | Patton | Aug. 7, 1951 |
| 2,699,188 | Caldwell | Jan. 11, 1955 |
| 2,815,074 | Dehn | Dec. 3, 1957 |
| 3,049,956 | Lynch | Aug. 21, 1962 |
| 3,082,656 | Day et al. | Mar. 26, 1963 |